(12) United States Patent
Grass et al.

(10) Patent No.: US 9,555,351 B2
(45) Date of Patent: Jan. 31, 2017

(54) FILTER DEVICE

(75) Inventors: Uwe Grass, Stuttgart (DE); Mike Schmid, Tübingen (DE); Andreas Widmaier, Herrenberg (DE)

(73) Assignee: Mahle International GmbH (DE)

(*) Notice: Subject to any disclaimer, the term of this patent is extended or adjusted under 35 U.S.C. 154(b) by 1908 days.

(21) Appl. No.: 12/809,198

(22) PCT Filed: Dec. 4, 2008

(86) PCT No.: PCT/EP2008/066751
§ 371 (c)(1),
(2), (4) Date: Dec. 22, 2010

(87) PCT Pub. No.: WO2009/080455
PCT Pub. Date: Jul. 2, 2009

(65) Prior Publication Data
US 2011/0089091 A1 Apr. 21, 2011

(30) Foreign Application Priority Data
Dec. 21, 2007 (DE) .................. 10 2007 062 102

(51) Int. Cl.
*B01D 35/04* (2006.01)
*B01D 35/153* (2006.01)

(52) U.S. Cl.
CPC ..... *B01D 35/153* (2013.01); *B01D 2201/4007* (2013.01); *B01D 2201/4046* (2013.01); *B01D 2201/52* (2013.01)

(58) Field of Classification Search
USPC .................................. 210/85, 90
See application file for complete search history.

(56) References Cited

U.S. PATENT DOCUMENTS

| 4,384,474 A | 5/1983 | Kowalski |
| 6,936,169 B2 | 8/2005 | Baumann et al. |
| 2003/0150787 A1 | 8/2003 | Morita |
| 2006/0060512 A1 | 3/2006 | Astle et al. |

FOREIGN PATENT DOCUMENTS

| CN | 101049990 A | 10/2007 |
| DE | 102006028148 A1 | 12/2007 |
| EP | 1229985 B1 | 8/2002 |
| EP | 1361196 A1 | 11/2003 |
| EP | 1479427 A1 | 11/2004 |
| JP | 62038215 A | 2/1987 |
| JP | 11-137917 A | 5/1999 |

(Continued)

OTHER PUBLICATIONS

English translation of Japanese Office Action for JP2010-538548.

(Continued)

*Primary Examiner* — Dirk Bass
(74) *Attorney, Agent, or Firm* — Fishman Stewart PLLC

(57) ABSTRACT

A filter device having a filter element received in a filter housing, the filter housing has an inlet and an outlet. The filter element separates a crude chamber that communicates with the inlet from a pure chamber that communicates with the outlet. The filter element has an axially and eccentrically projecting plug, which in an inserted state, is plugged into a plug receptacle formed within the filter housing, and wherein at least one signal generator recognizes at least one of a presence and an absence of the plug in the plug receptacle, generating at least one signal.

19 Claims, 4 Drawing Sheets

(56) References Cited

FOREIGN PATENT DOCUMENTS

| | | |
|---|---|---|
| JP | 2001-205021 A | 7/2001 |
| JP | 2003512165 A | 4/2003 |
| JP | 2003-232208 A | 8/2003 |
| JP | 2004238853 A | 8/2004 |
| JP | 2006007140 A | 1/2006 |
| WO | WO-0130480 A1 | 5/2001 |
| WO | WO-2005113112 A1 | 12/2005 |

OTHER PUBLICATIONS

English abstract provided for DE102006028148.
English abstract provided for EP1229985.
English abstract provided for JP2001205021.
English abstract provided for JP2006-007140.
English abstract provided for JP2004-238853.
English abstract provided for JP62-038215.
Office Action from corresponding JP patent application No. 2010-538548 dated May 15, 2012 with English translation.
English translation of first CN Office Action (CN 200880121874.5) dated Jun. 14, 2012.
English abstract for CN101049990.

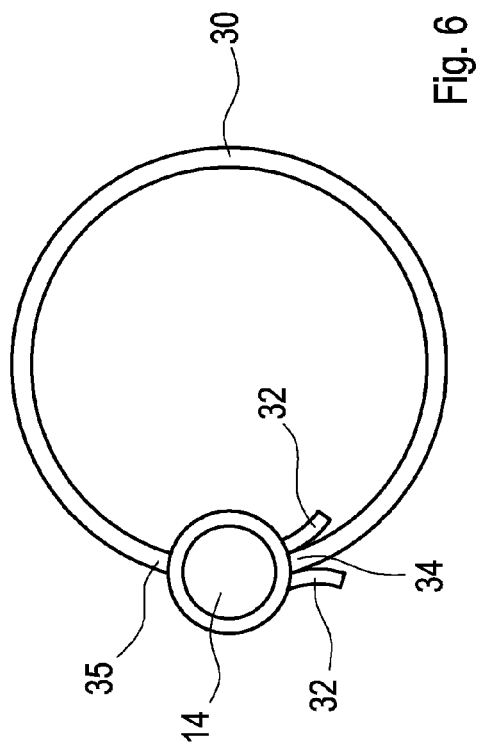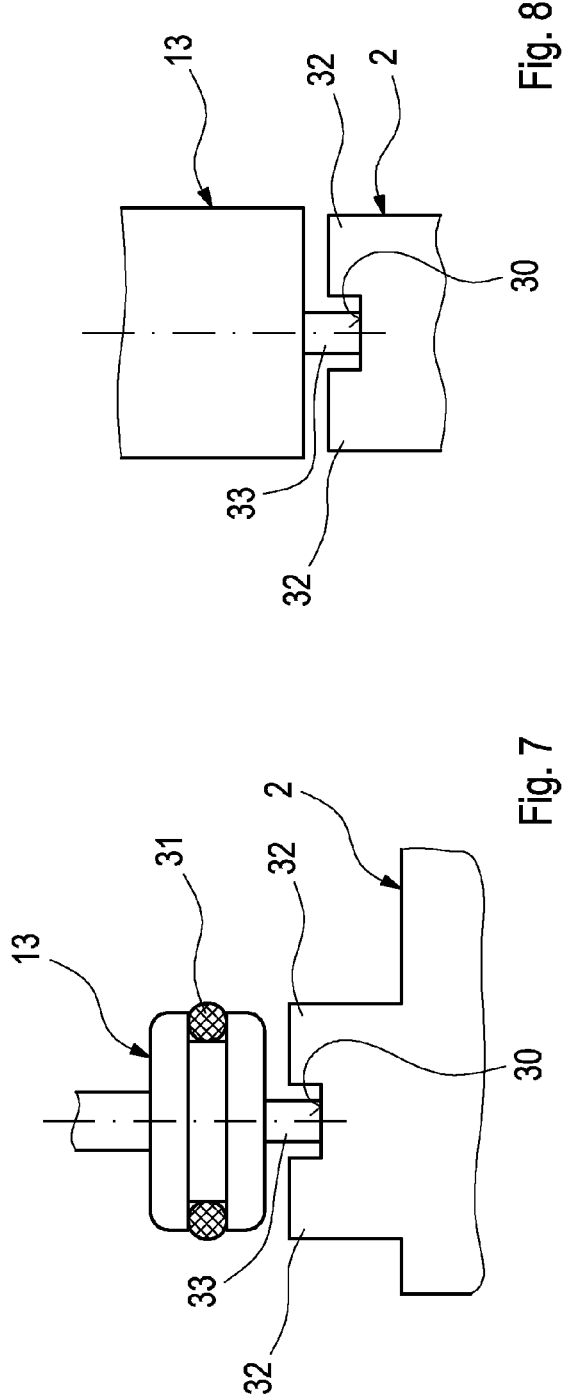

FILTER DEVICE

CROSS-REFERENCES TO RELATED APPLICATIONS

This application claims priority to German patent applications DE 10 2007 062 102.9 filed on Dec. 21, 2007, and PCT/EP2008/066751 filed on Dec. 4, 2008, both of which are hereby incorporated by reference in their entirety.

TECHNICAL FIELD

The present invention relates to a filter device for filtering a liquid in an internal combustion engine, in particular in a motor vehicle, with the features of the preamble of claims 1.

BACKGROUND

From EP 1 229 985 B1, such a filter device is known which concerns preferably an oil filter for cleaning lubrication oil, in particular for internal combustion engines of motor vehicles. The known filter device comprises a filter housing for receiving a filter element, wherein the filter housing has an inlet on the crude side and an outlet on the pure side. In the inserted state, the filter element separates a crude chamber that communicates with the inlet from a pure chamber that communicates with the outlet. Furthermore, the filter housing of the known filter device has a drain line which communicates with the crude chamber and which forms a plug receptacle for an axially and eccentrically projecting plug which is formed on the filter housing, into which receptacle the plug is plugged in the inserted state of the filter element. Thus, the plug closes the drain line when the filter element is properly inserted into the filter housing. For a simplified finding and inserting of the plug into said plug receptacle, in the known filter device, a concentrically arranged and helically ascending or descending ramp is provided at the housing, wherein the plug receptacle, thus an inlet region of the drain line, is arranged between a lower ramp end and an upper ramp end. When screwing on a cover, together with which the filter element is inserted or screwed-in, through the rotation of the filter element and through the sliding of the plug along the ramp, the plug automatically finds the plug receptacle, can penetrate therein and close the drain line. In a particularly advantageous embodiment of the known filter device, the ramp and the plug can interact according to the key-lock-principle so that only a filter element provided with a plug adapted to the ramp can be used in such a manner with the housing of the known filter device that the plug finds and closes the plug receptacle automatically when screwing-on the cover.

With a missing filter element or when using a filter element which is not specifically adapted to the filter housing, a sufficient purification of the respective liquid for the operation of the internal combustion engine can not be ensured. Accordingly, the danger of damage to the internal combustion engine caused by contamination carried along with the respective liquid increases.

SUMMARY

The present invention is concerned with the problem to provide, for a filter device of the above mentioned type, an improved embodiment which is in particular characterized in that the absence of the filter element or the use of a filter element which is not specifically adapted to the filter housing can be prevented in an easier manner.

This problem is solved according to the invention by the subject matters of the independent claims. Advantageous embodiments are subject matter of the dependent claims.

The invention is based on the general idea to equip the filter device with a signal generator which is able to detect and signalize the presence or the absence of the plug and thus of a filter element equipped with the plug. This information can be transferred, for example, to the electronic system of a vehicle, for example to indicate a missing filter element to the driver. Also, it is principally possible that the electronic system of the vehicle prevents the internal combustion engine from starting when the filter element is missing. Thus, by the proposed design, damage to the internal combustion engine caused by contaminants, which can be conveyed to the internal combustion engine when the filter element is missing, can effectively be avoided.

The signal generator works electrically, that is, upon its actuation, it sends a corresponding electrical signal, which correlates with the presence or the absence of the plug, to a corresponding control system. The signal generator can involve, for example, a reed contact or a RFID transponder reader (RFID=Radio Frequency Identification). Also, the signal generator can be formed by a Hall sensor or a switch.

The plug receptacle can principally be configured as a blind hole or pocket hole, thus has no further function other than receiving the plug. In another embodiment, the plug receptacle can be formed by an inlet region of a return line or drain line communicating with the crude chamber. Hereby, in connection with the plug receptacle formed by the return line or drain line, the plug is given an additional function, namely to block the return line or drain line when penetrating into the plug receptacle. When the plug is missing or when the filter element is missing, a substantial portion of the liquid delivered through the inlet into the filter housing can discharge again through the return line or the drain line, for example into a reservoir from which a suitable delivery device delivers the liquid to the inlet. In this manner, a desired pressure can not build up in the outlet. The signal generator can be formed by a pressure sensor which is arranged within the return line or the drain line and which signalizes upon a predetermined pressure increase that the plug or filter element is missing. If no pressure increase occurs within the drain line or return line, a suitable control logic assumes that the return line or the drain line is closed, namely by the plug. This means, when the pressure increase does not occur, the presence of the plug or the filter element is signalized. Alternatively, the signal generator can comprise a pressure sensor arranged within the return line, or a pressure sensor which is potentially arranged within the return line anyway can be used as signal generator. By means of this pressure sensor, a suitable control logic can recognize that the plug and thus the filter element is not present when a predetermined pressure does not build up within the outlet. Also, in case of an insufficient pressure increase, the absence of the filter element can be signalized.

Further important features and advantages arise from the sub-claims, from the drawings, and from the associated description of the figures based on the drawings.

It is to be understood that the above mentioned features and the features yet to be explained hereinafter can be used not only in the respectively mentioned combination but also in other combinations or alone without departing from the scope of the present invention.

Preferred exemplary embodiments of the invention are illustrated in the drawings and are explained in the following description in more detail, wherein identical reference numbers refer to identical, or similar, or functionally identical components.

BRIEF DESCRIPTION OF THE DRAWING

In the Figures:

FIG. 6 shows schematically a greatly simplified top view of a ramp, FIGS. 7 and 8 each show schematically greatly simplified views of a plug in the region of the ramp of different embodiments.

DETAILED DESCRIPTION

Figure 1:
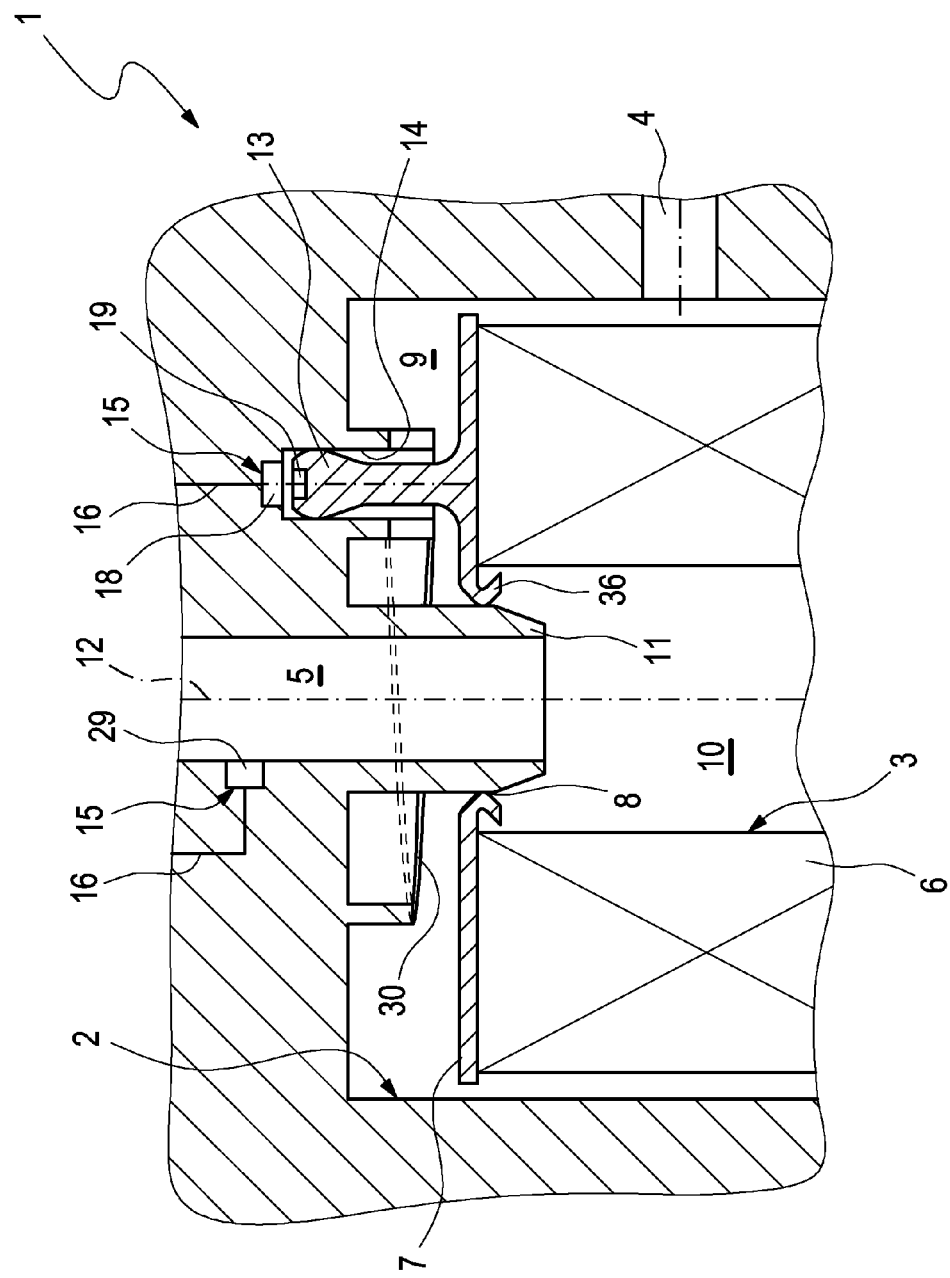
FIG. 1 shows schematically a cross-section through a filter device in the region of a plug receptacle.
Figure 2:
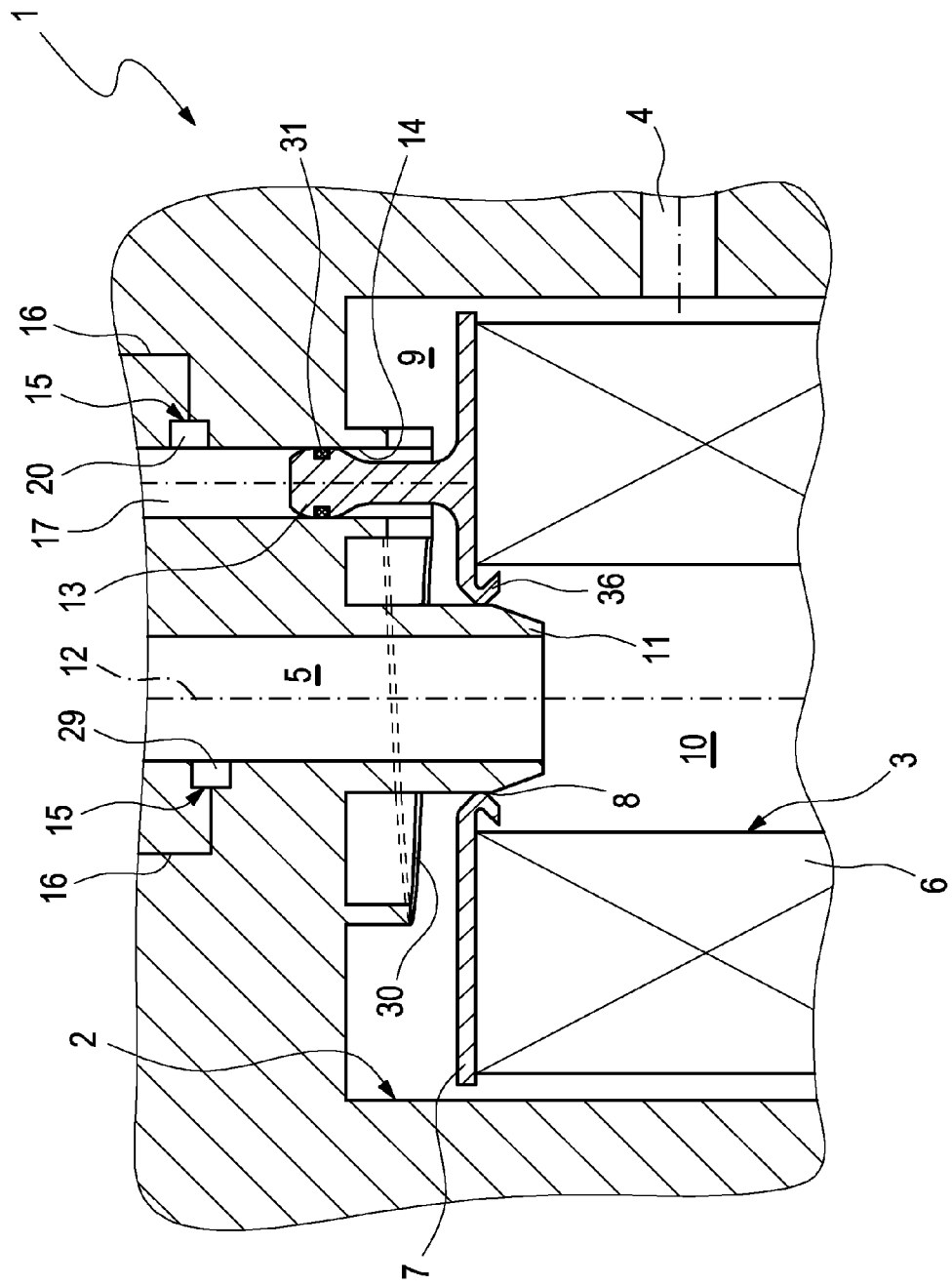
FIG. 2 shows schematically a view as in FIG. 1 but of a different embodiment, FIGS. 3 to 5 each show schematically an enlarged detailed view in the region of the plug receptacle, of different embodiments.

According to FIGS. 1 and 2, a filter device 1 comprises a filter housing 2 which is configured for receiving a filter element 3. The filter housing 2 has an inlet 4 on the crude side and an outlet 5 on the pure side. The filter device 1 serves for filtering a liquid of an internal combustion engine which can be arranged in particular in a motor vehicle. In particular, the filter device 1 serves for filtering lubricating oil of the internal combustion engine. Also, in principle, an embodiment is conceivable in which the filter device 1 serves for filtering fuel or any other liquid of the internal combustion engine.

The filter element 3 is preferably designed as a ring filter element and has accordingly a ring-shaped or cylindrical filter body 6. The filter body 6 consists of a usual filter material such as, e.g. filter paper or filter fleece. At an axial end, shown in FIGS. 1 and 2, the filter element 3 comprises an end disk 7 which is connected with the filter body 6 in a liquid-tight manner. The end disk 7 can be welded or glued to the filter body 6 or can be connected in any other suitable manner. For example, the filter material of the filter body 6 can be plasticized into the end disk 7. The shown end disk 7 has a central opening 8 so that it concerns an open end disk 7 here. At its other axial end, the filter element 3 can comprise a further end disk which can be open or closed. Within the filter housing 2, the filter element 3 separates a crude chamber 9 from a pure chamber 10. The crude chamber 9 communicates with the inlet 4 whereas the pure chamber 10 communicates with the outlet 5. In the example, the pure chamber 10 is formed in the filter element's 3 interior enclosed by the filter body 6. In the example, a flow thus can pass through the filter element 3 radially from the outside inwardly. The filter housing 2 has a port 11 onto which the open end disk 7 with its opening 8 can be fitted. The outlet 5 communicates through port 11 with the interior of the filter element 3, thus, with the pure chamber 10. On the open end disk 7, a radial seal 36 is integrally formed, which seal interacts with the port 11.

The filter element 3 has a plug 13 which projects axially and eccentrically with respect to a longitudinal center axis 12 of the filter element 3. Said plug 13 is preferably formed on the end disk 7. For example, the plug 13 is integrally formed on the end disk 7. Also, the plug 13 can be mounted completely or in part to the end disk 7.

The housing 2 has a plug receptacle 14. The same is open toward the crude chamber 9. The filter housing 2 and the filter element 3 are adapted to one another in such a manner that the plug 13 projects axially into the plug receptacle 14 or is plugged into the same when the filter element 3 is properly inserted into the filter housing 2.

In addition, the filter device 1 has at least one signal generator 15 which is configured and/or arranged in such a manner that it can recognize and, if necessary, electrically signalize the absence and/or the presence of the plug 13 in the plug receptacle 14. The respective signal generator 15, for example, can be connected via a respective signal line 16 to a control which is not shown here.

In the embodiment shown in FIG. 1, the plug receptacle 14 is formed as a blind hole. In particular, besides the capability to receive the plug 13, this blind hole or plug receptacle 14 has no further function. In contrast, FIG. 2 shows an embodiment in which the plug receptacle 14 is formed by an inlet region of the return line or drain line 17 which communicates with the crude chamber 9. Here, the plug 13 fulfills the additional function to close the drain line or return line 17 when it is plugged into the inlet region of the return line or drain line 17. For this, the plug 13 can be equipped with a corresponding radial seal 31 which, for example, is an O-ring.

Hereinafter, a plurality of different, purely exemplarily selected embodiments for the signal generator 15 are illustrated which, in the embodiment shown in FIG. 1, with the plug receptacle 14 formed as a blind hole, as well as in the embodiment shown in FIG. 2, with the plug receptacle 14 formed by the inlet region of the return line or drain line 17, can be implemented in a cumulatively combined or alternatively combined or arbitrarily combined manner.

According to FIG. 1, the signal generator 15 can comprise a Hall sensor 18. On the plug 13, a contact element 19 can be attached, the approach of which can be detected by the Hall sensor 18. The contact element 19 can involve, for example, a magnet body or a metal body.

According to FIG. 2, the signal generator 15 can additionally or alternatively comprise a pressure sensor 20 which is arranged in the return line or drain line 17 and by means of which the pressure of the liquid in the drain line 17 or return line 17 can be determined. If this pressure reaches a predetermined value, a control logic assumes that the plug 13 is not present or that the entire filter element 3 is not present. If the pressure increase in the drain line 17 or the return line 17 does not occur, the control logic assumes that the plug 13 closes the inlet region 14 of the drain line 17 or the return line 17 properly. Consequently, the filter element 3 must be present.

Figure 3:
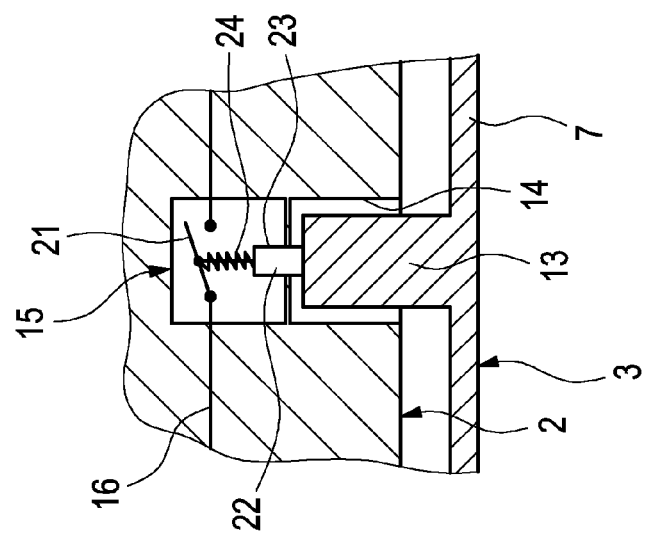

In the variant shown in FIG. 3, the signal generator 15 can comprise a switch 21 which can be actuated through a button 22 upon physical contact with the plug 13. The button 22 has an actuator 23 which is mounted in an axially adjustable manner and which, for example, is pretensioned by means of a spring 24 and which projects into the plug receptacle 14. When the plug 13 is missing, for example, the switch 21 is closed, whereby the absence of plug 13 and thus of filter element 3 is signalized. When the plug 13 is plugged into the plug receptacle 14, the switch 21 opens and signalizes the presence of the filter element 3. It is clear that in a different embodiment, the switch 21 only closes when the plug 13 is inserted into the plug receptacle 14 and is open when the plug 13 is missing.

Figure 4:
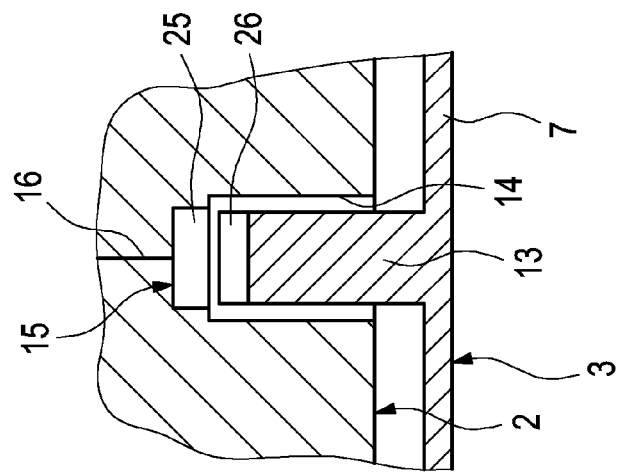

In the embodiment shown in FIG. 4, the signal generator can comprise a reed contact 25 which can be actuated by means of magnetic forces. For this, the plug can be equipped with a permanent magnet 26.

Figure 5:
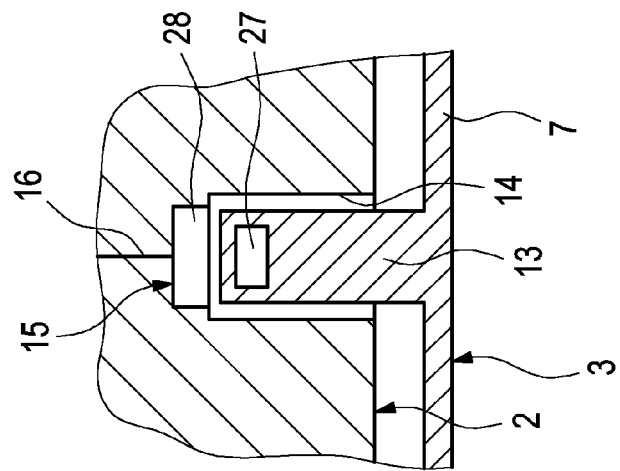

According to FIG. 5 it can be provided to equip the signal generator 15 with a RFID transponder reader 28 which can interact with a RFID transponder 27 for wireless data exchange. For this, said RFID transponder 27 is arranged within the plug 13. The transponder reader 28 is arranged within the filter housing 2 at a suitable position. By means of the RFID transponder 27, the reader 28 can read at least the information that a certain filter element 3 is present. Furthermore, it can optionally be provided that through the RFID transponder 27, additional data and information can be transferred such as, for example, date and place of manufacture of the filter element 3 and a precise type designation of the filter element 3.

According to FIGS. 1 and 2, the signal generator 15 can also comprise a pressure sensor 29 which is arranged in the outlet 5 and by means of which a pressure of the liquid within the outlet 5 can be determined. If the pressure within the outlet 5 rises to a predetermined value, a control logic assumes that the drain line 17 or the return line 17 is closed so that a fitting filter element 3 with plug 13 must be present. If the predetermined pressure increase in the outlet 5 does not occur, the control logic has to assume that the return line 17 or the drain line 17 is open so that either the filter element 3 is missing or the filter element 3 is not inserted properly, or that a wrong filter element 3 is inserted.

According to a particularly advantageous embodiment, the return line 17 or the drain line 17 can be throttled in such a manner that a delivery device, which delivers the respective liquid through the inlet 4, is able, even when the filter element 3 is missing, to deliver an amount of liquid through outlet 5 which is sufficient for an emergency supply of the internal combustion engine. For example, even when the filter element 3 is missing, in this manner, an emergency volume flow can be delivered which ensures temporarily an emergency supply of the internal combustion engine. For this emergency operation, a suitable control can specify in particular reduced performance data for the internal combustion engine so that the vehicle equipped therewith can be moved at least to a repair shop, for example, not at full performance, but only with a greatly reduced performance.

In the embodiments shown in FIGS. 1 and 2, the filter element 3 is arranged suspended within the filter housing 2. It is clear that a standing arrangement for the filter element 3 within the filter housing 2 is principally also possible. Further, a lying arrangement of the filter element 3 within the filter housing 2 can also be implemented.

According to FIGS. 1 and 2, the housing 2 can comprise a ramp 30. The same is circuit-shaped and leads toward the plug receptacle 14. Here, the ramp 30 descends helically toward the plug receptacle 14. When screwing in the filter element 3, the plug 13 can slide along the ramp 30. By means of the ramp 30, the insertion of the plug 13 into the plug receptacle 14 is significantly simplified.

Provided that the filter housing 2 is equipped with such a ramp 30, it is in particular possible to implement a special embodiment, which is explained in more detail in the FIGS. 6 to 8. In these special embodiments, the ramp 30 and the plug 13 are formed and adapted to one another in such a manner that they interact according to the key-lock principle. Said key-lock-principle has the effect that only such filter elements 3 can be properly used with the filter device 1 for which the plug 13 is specifically adapted to the ramp 30. The relevant proper use includes here that when attaching or rotating the filter element 3, the plug 13 finds and closes the plug receptacle 14 automatically and penetrates into the same. In case of a filter element 3 which is not specifically adapted to the filter device 1, the key-lock-principle prevents that the potentially present plug 13 is able to find the plug receptacle 14 automatically when screwing in the filter element 3. Hereby is intended to achieve that only filter elements 3 can be used which are accurately adapted for the filter device 1, for example, to be able to ensure a proper filter function.

To implement this key-lock-principle, according to FIGS. 6 to 8, an insertion contour with guiding bodies 32 can be provided, which can be arranged on one side or on both sides of the ramp 30 and which project axially beyond the ramp 30. A plug 13 sliding downwards along the ramp 30 can reach the plug receptacle 14 only when it has a projection 33 which is adapted to the guiding bodies 32 and which projects axially from the respective plug 13. This projection 33 is, for example, a tapered or a pin-shaped or a rib-shaped lug which establishes the contact between the plug 13 and the ramp 30. This projection 33 is axially dimensioned in such a manner that it can lift the plug 13 across the guiding elements 32. This means, the plug 13, which slides via the projection 33 on the ramp 30, is spaced apart far enough from the guiding bodies 32 that it can be oriented passing along the guiding bodies 32 in alignment with the plug receptacle 14. According to the FIGS. 6 to 8, the projection 33 can contact the ramp 30 between and through the guiding bodies 32, thereby allowing the sliding of the plug 13.

According to FIG. 6, the guiding bodies 32 are arranged in the region of the lower ramp end 34. The plug receptacle 14 is arranged in circumferential direction between the lower ramp end 34 and an upper ramp end 35 which descends along the ramp 30 toward the lower ramp end 34.

Apart from that, with respect to the key-lock-principle and its implementation, reference is made to the above mentioned EP 1 229 985 B1 which is hereby added by explicit reference to the disclosure content of the present invention.

The invention claimed is:

1. A liquid filter device, comprising:
a filter housing having a plug receptacle formed therein,
at least one signal generator disposed in the plug receptacle, and
a filter element received in the filter housing,
wherein the filter housing has an inlet on a crude side and an outlet on a pure side,
wherein the filter element separates a crude chamber that communicates with the inlet from a pure chamber that communicates with the outlet,
wherein the filter element has an axially and eccentrically projecting plug which in an inserted state, is plugged into the plug receptacle formed within the filter housing, and wherein the at least one signal generator recognizes at least one of a presence and an absence of the plug in the plug receptacle, generating at least one signal.

2. The filter device according to claim 1, wherein electrical signals are generated from an interaction between the plug and the signal generator to signalize at least one of the presence and the absence of the plug.

3. The filter device according to claim 1 wherein the signal generator has at least one of a reed contact and a Hall sensor and a switch.

4. The filter device according to claim 1, wherein the plug receptacle is formed as a blind hole.

5. The filter device according to claim 1, wherein the plug receptacle is formed by at least one of an inlet region of a return line and an inlet region of a drain line that communicates with a crude chamber.

6. The filter device according to claim 5, wherein the signal generator has a pressure sensor arranged in at least one of the return line and the drain line.

7. The filter device according to claim 5, wherein the signal generator has a pressure sensor arranged in the outlet, wherein the pressure sensor arranged in the outlet is used as a signal generator.

8. The filter device according to claim 5, wherein at least one of the return line and the drain line is throttled such that an emergency volume flow can be delivered through the outlet when the filter element is missing.

9. The filter device according to claim 1, wherein the housing has a circuit-shaped ramp, leading toward the plug receptacle, wherein the plug slides along the ramp when screwing in the filter element.

10. The filter device according to claim 1, wherein the filter element is arranged within the filter housing in at least one of a suspended and lying position.

11. The filter device according to claim 1, wherein the filter device is configured for filtering at least one of lubricating oil and fuel.

12. A filter element, comprising: an axially and eccentrically projecting plug, wherein the filter element plug penetrates into a plug receptacle formed within a filter housing of a filter device, wherein at least one signal generator recognizes at least one of a presence and an absence of the plug in the plug receptacle, generating at least one signal; wherein the at least one signal generator is disposed in the plug receptacle.

13. The filter element according to claim 12, wherein the signal generator has at least one of a reed contact and a Hall sensor and a switch.

14. The filter element according to claim 12, wherein the plug receptacle is formed as a blind hole.

15. The filter element according to claim 12, wherein the plug receptacle is formed by at least one of an inlet region of a return line and an inlet region of a drain line that communicates with a crude chamber adjacent the filter element.

16. The filter element according to claim 12, wherein at least one of a return line and a drain line is throttled such that an emergency volume flow can be delivered through an outlet when the filter element is missing.

17. The filter element according to claim 12, wherein the housing has a circuit-shaped ramp, leading toward the plug receptacle, wherein the plug slides along the ramp when screwing in the filter element.

18. The filter element according to claim 12, wherein the filter element is arranged within the filter housing in at least one of a suspended and lying position.

19. The filter element according to claim 12, wherein the filter device is configured for filtering at least one of lubricating oil and fuel.

* * * * *